United States Patent [19]

Theodorou

[11] Patent Number: 5,797,234

[45] Date of Patent: Aug. 25, 1998

[54] FLEXIBLE CONNECTOR AND ASSEMBLY FOR STRUCTURAL CONNECTION

[76] Inventor: Antonis Theodorou, 737 Danielle Ct., Sleepy Hollow, Ill. 60118

[21] Appl. No.: 810,064

[22] Filed: Mar. 4, 1997

[51] Int. Cl.$^6$ .................................. E04C 3/00; E04C 3/30
[52] U.S. Cl. .................... 52/578; 52/582.1; 52/587.1; 403/229; 403/223; 403/220; 403/41
[58] Field of Search .................... 52/578, 582.1, 52/587.1; 403/229, 223, 220, 41, 291, 178, 174, 170, 349

[56] References Cited

U.S. PATENT DOCUMENTS

| | | | |
|---|---|---|---|
| 2,250,175 | 7/1941 | Blaski | 52/223.7 X |
| 2,665,387 | 1/1954 | Bartow | 52/223.7 X |
| 2,874,812 | 2/1959 | Clevett, Jr. | 52/223.7 |
| 2,877,508 | 3/1959 | Almoslino | 52/223.7 |
| 4,111,401 | 9/1978 | Pickett | 52/223.7 X |

*Primary Examiner*—Creighton Smith
*Assistant Examiner*—W. Glenn Edwards
*Attorney, Agent, or Firm*—Meroni & Meroni

[57] ABSTRACT

A flexible corner connector is provided for use in holding frame members of a structure together. The flexible connector includes a first rigid end portion having threaded surfaces adapted for receiving a threaded nut. A second rigid end portion has an enlarged head at a distal end thereof. An elongated flexible member is attached to and extends between the first and second rigid end portions. A spike washer is engageable on the first rigid end portion. The first rigid end portion and spike washer are shaped and configured for mated engagement with one another to prevent rotation of the first rigid end portion. The spike washer has at least two projections outwardly extending for engagement into a frame member.

34 Claims, 9 Drawing Sheets

FLEXIBLE CONNECTOR AND ASSEMBLY FOR STRUCTURAL CONNECTION

BACKGROUND OF THE INVENTION

1. Field of the Invention

The present invention relates generally to connectors and assemblies for the connection of frames and structures. More particularly, the invention pertains to a flexible connector for use in the connection of frame members at corners of a structure.

2. Description of the Prior Art

In the building and construction industries, the connection of frames or other members are commonly achieved through the use of screws, nails, bolts, or other similarly rigid connectors. At corners or other junction points where a plurality of elongated frame members meet along their length, each frame member is typically independently connected to an adjacent frame member to secure the members together. While this conventional form of construction produces a strong connection between adjoining members, it suffers in several regards.

For example, this form of construction is fairly labor intensive which results in increased costs. Further, the rigid nature of each corner or junction using this procedure requires the builder to have meticulously planned and measured each portion of the structure so that when the final portions of structure are to be completed, the structure is appropriately sized to match the final members.

When constructing the frame of a building such as a gazebo for example, one often begins construction of the walls separately and then connects each succeeding wall to one another until the last wall is connected to complete the geometric shape of the structure. However, any errors or inconsistencies in measurement or in construction for each prior wall are cumulatively added in the resulting structure, such that the final wall or segment may not appropriately fit when positioned into place. The lack of flexibility in the conventional connections between the walls does not aid in a providing any real solution relating to possible adjustments due to the connection's rather unyielding nature.

As will be described in greater detail hereinafter, the flexible connector and corner connection of the present invention solves the aforementioned problems and employs a number of novel features that render it highly advantageous over the prior art.

SUMMARY OF THE INVENTION

Accordingly, it is an object of this invention to provide a connector for use in the connection of building or frame members.

Another object of this invention is to provide a connector that would result in decreased labor costs in building construction.

Another object of this invention is to provide a connector that is easy to use and well suited for use in building assembly kits that would be desirable for both home owners and businesses, as well as those requiring the use of knock-down type structures for trade shows and the like.

Still another object of this invention is to provide a flexible connector that is adapted to bend around a corner, as well as connect members that are not perfectly lined up with one another.

Yet another object of this invention is to provide an assembly in combination with the flexible connector that is adapted and well suited for removal and reassembly of a partial section or side of a structure or frame without the need or requirement of taking apart additional portions of the structure. The flexible connector allows one to "fish" the flexible connector through structural members while the members are in a curved or non-aligned position.

To achieve the foregoing and other objectives, and in accordance with the purposes of the present invention a flexible connector is provided for use in holding at least two frame members together. The flexible connector includes a first rigid end portion having threaded surfaces adapted for receiving a threaded nut. A second rigid end portion has an enlarged head at a distal end thereof An elongated flexible member is attached to and extends between the first and second rigid end portions. A spike washer is provided having an aperture therethrough. The spike washer is engageable on the first rigid end portion. The first rigid end portion and aperture are shaped and configured for mated engagement to prevent rotation of the first rigid end portion during connection with the nut. The spike washer has at least two projections outwardly extending from an inner facing surface of the spike washer for fixed engagement into a frame member.

In accordance with an aspect of the invention, a plurality of frame members oriented in side-by-side engagement with one another form a corner. A longitudinal axis of each of the plurality of frame members are parallel to one another. Each of the plurality of frame members have a hole extending therethrough perpendicular to each respective longitudinal axis. Each of the holes between adjacently engaging frame members are in overlapping adjacency with one another to allow the flexible corner connector to extend through the holes to secure the plurality of frame members in unitary assembly.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
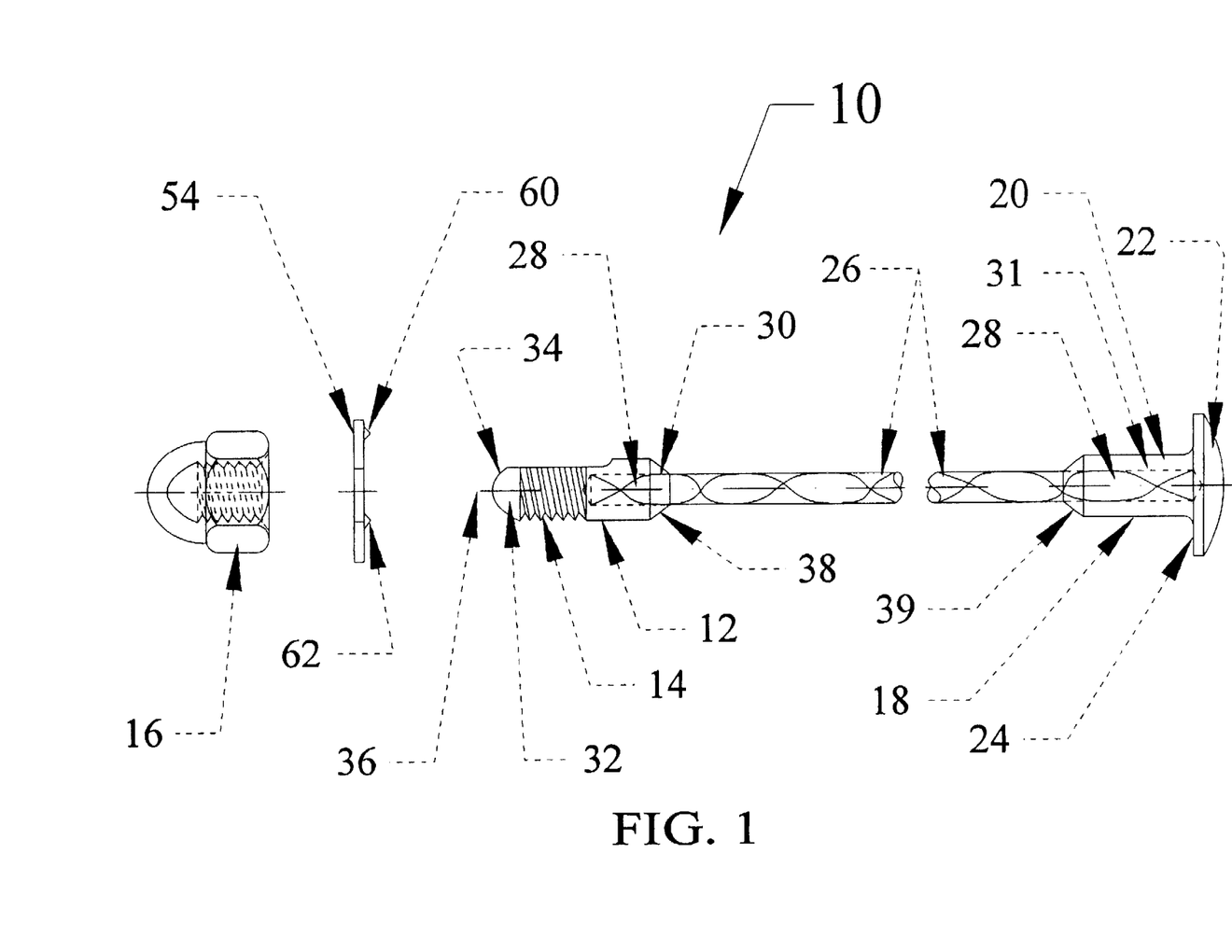
FIG. 1 is an exploded perspective view of the present invention.

Referring now to the drawings, a flexible connector 10 is illustrated in FIG. 1. The flexible connector 10 includes a generally cylindrically shaped first rigid end portion 12. having threaded surfaces 14 for receiving a threaded nut 16.

A second rigid end portion 18 has a generally cylindrically shaped body 20 and an enlarged head 22 at a distal end 24 thereof An elongated flexible member 26 is connected to and extends between the first and second rigid end portions 12,18. Preferably, the flexible member 26 is formed of cable, such as stainless steel cable which is composed of wires twisted or laid together in a helical relation. Opposite ends 28 of the flexible member are preferably connected to respective end portions 12,18 by inserting the ends 28 into axial holes 30,31 of the respective end portions 12,18 and welding the ends 28 therein. However, it should be understood that other manners of attachment could be employed including crimping, threading, and other forms of welding.

It is noteworthy that the elongated flexible member 26 has a diameter less than respective diameters of the first and second rigid end portions 12,18 so that the elongated flexible member 26 has increased flexibility allowing the flexible member to bend about corners as later described. In the preferred embodiment illustrated in FIG. 1, the flexible member 10 has diameter of approximately one half the size of respective diameters of the first and second rigid end portions 12,18.

A distal end 32 of the first rigid end portion 12 is rounded and has a convex annular surface 34 co-axial with a longitudinal axis 36 of the first rigid end portion 12. The rounded distal end 32 allows for improved installation of the connector 10 where the end 32 is threaded through a series of holes as later described. Each of the first and second rigid end portions 12,18 has a sloped annular surface 38,39 extending inwardly from each respective end portion 12,18 towards the elongated flexible member 26. The sloped surfaces 38,39 thereby eliminate any edges on the end portion 12,18 between the flexible member 26 that would be susceptible to becoming caught or otherwise trapped against any protrusions or edges when the flexible member 26 is installed or removed from within holes 40 of frame members 42 (FIG. 2).

Figure 2:
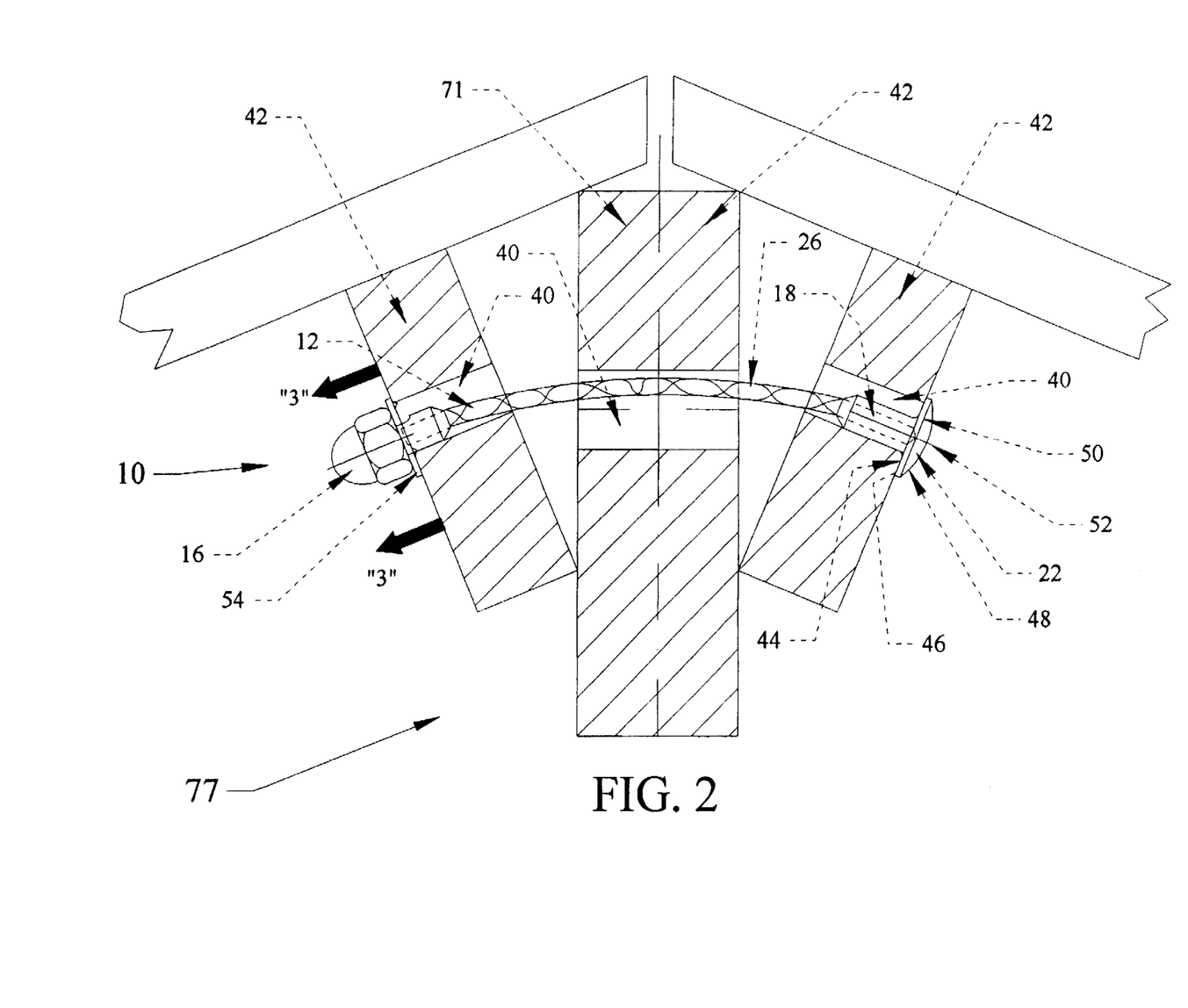
FIG. 2 is an elevation view in section of the flexible connector of the present invention securing several frame members together.

Referring to FIG. 2, the enlarged head 22 has a flange 44 on an inwardly facing side 46 of the enlarged head 22 which is sized for flush engagement against a frame member 42. The enlarged head 22 in the preferred embodiment has a smooth convex annular outer surface 48 on an outwardly facing side 50 of the enlarged head 22 co-axial with a longitudinal axis 52 of the second rigid end portion 18.

Figure 3:
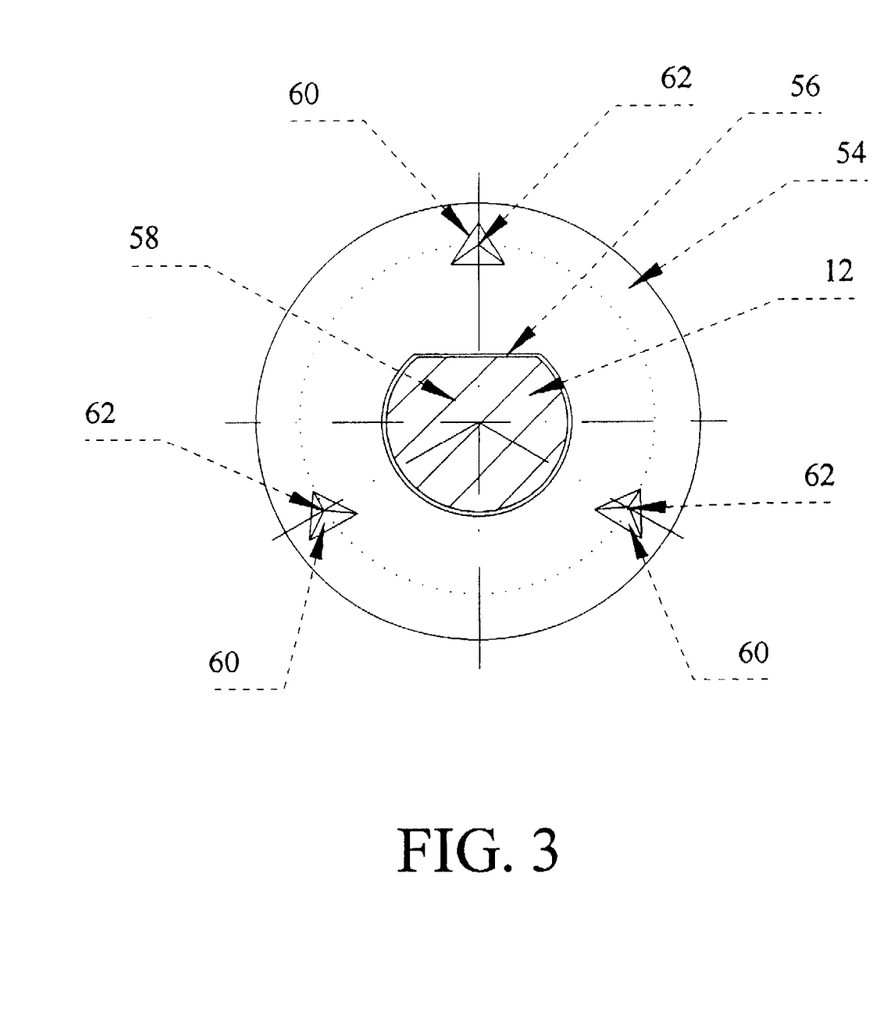
FIG. 3 is an enlarged sectional view taken along line 3—3 of FIG. 2.

Referring to FIGS. 2 and 3, a spike washer 54 is provided having an aperture 56 therethrough. The spike washer 54 is removably engageable on the first rigid end portion 12. The first rigid end portion 12 and aperture 56 are shaped and configured for mated or keyed engagement to prevent rotation the first rigid end portion 12 when the nut 16 is threadingly secured thereto. In the preferred embodiment, the aperture 56 and a nut and washer receiving portion 58 of the first rigid end portion 12 are generally D-shaped having a semi-circular portion and a flat portion which provide keyed surfaces for engagement. It should be understood that other types of keyed surfaces could be employed, however the D-shaped surfaces are preferred.

The spike washer 54 has at least two projections 60 outwardly extending from an inner facing surface 62 of the spike washer 54, although it should be understood that even one projection 60 would function to some degree. Preferably, the spike washer 54 has three projections 60 annularly spaced apart from one another. Each projection 60 has a pointed end 62 for biting or pressing engagement into one of the frame member 42 when the nut 16 is tightened and therefore correspondingly holds the first rigid end portion 12 in place. Preferably, the spike washer 54, end portions 12,18, and nut 16 are formed of brass or other suitable metal.

It is significant to note that engagement of the spike washer 54 into the frame member prevents axial rotation of the spike washer 54 about the first rigid end portion 12 as the nut 16 is tightened. Since the spike washer 54 is in keyed or mated engagement with the first rigid end portion 12, the spike washer 54 accordingly holds the first rigid end portion 12 in a fixed position while the nut 16 is turned.

Figure 6:
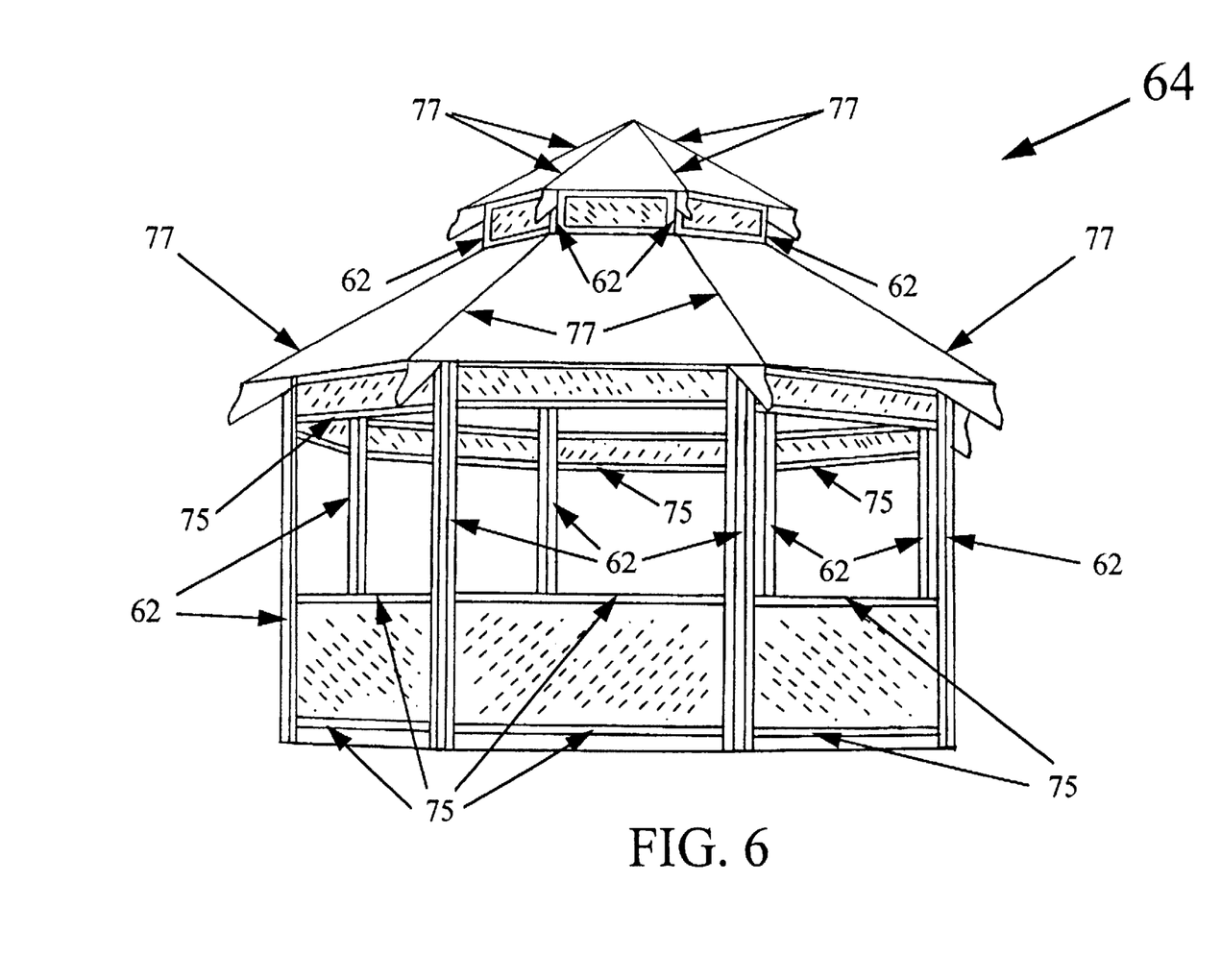
FIG. 6 is a perspective view of a structure utilizing plurality of corner or roof assemblies held together with the flexible connector.

Referring to FIGS. 4A–4D, and 5, various corner connection assemblies 62 are disclosed utilizing the flexible connector 10 to produce corners of varied degrees for use in structure 64 (FIG. 6). A plurality of frame members 42 are oriented in side-by-side pressing engagement with one another (FIGS. 5A and 5B). A longitudinal axis 66 of each of the plurality of frame members 42 are parallel to one another. Each of frame members 42 has a hole 68 extending therethrough perpendicular to each respective longitudinal axis 66. Each of the holes 68 between adjacently engaging frame members 42 are in overlapping adjacency with one another to allow the flexible corner connector 10 to extend through the holes 68 to secure the plurality of frame members 42 in unitary assembly.

Figure 4A:
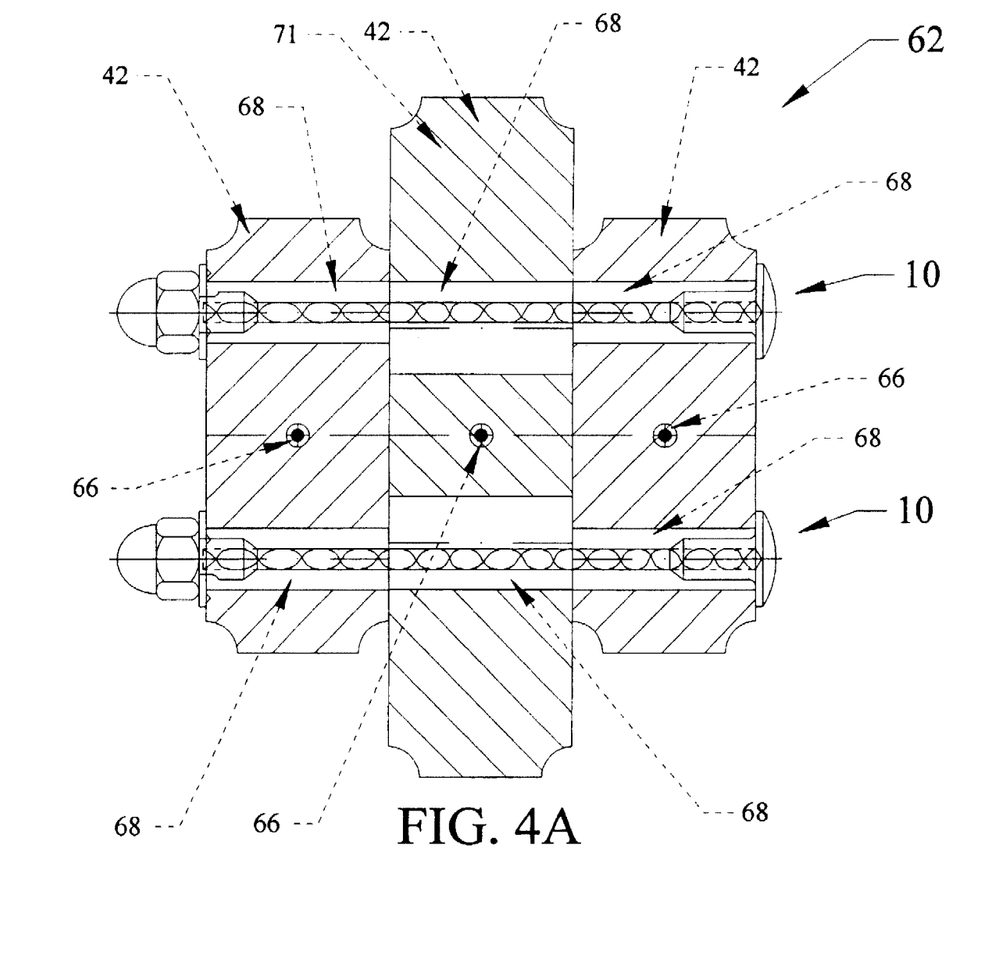
FIGS. 4A–4D are end views in section illustrating corners or joints of varied angled relation for use with the flexible connector to secure a plurality of frame members together.
Figure 4B:
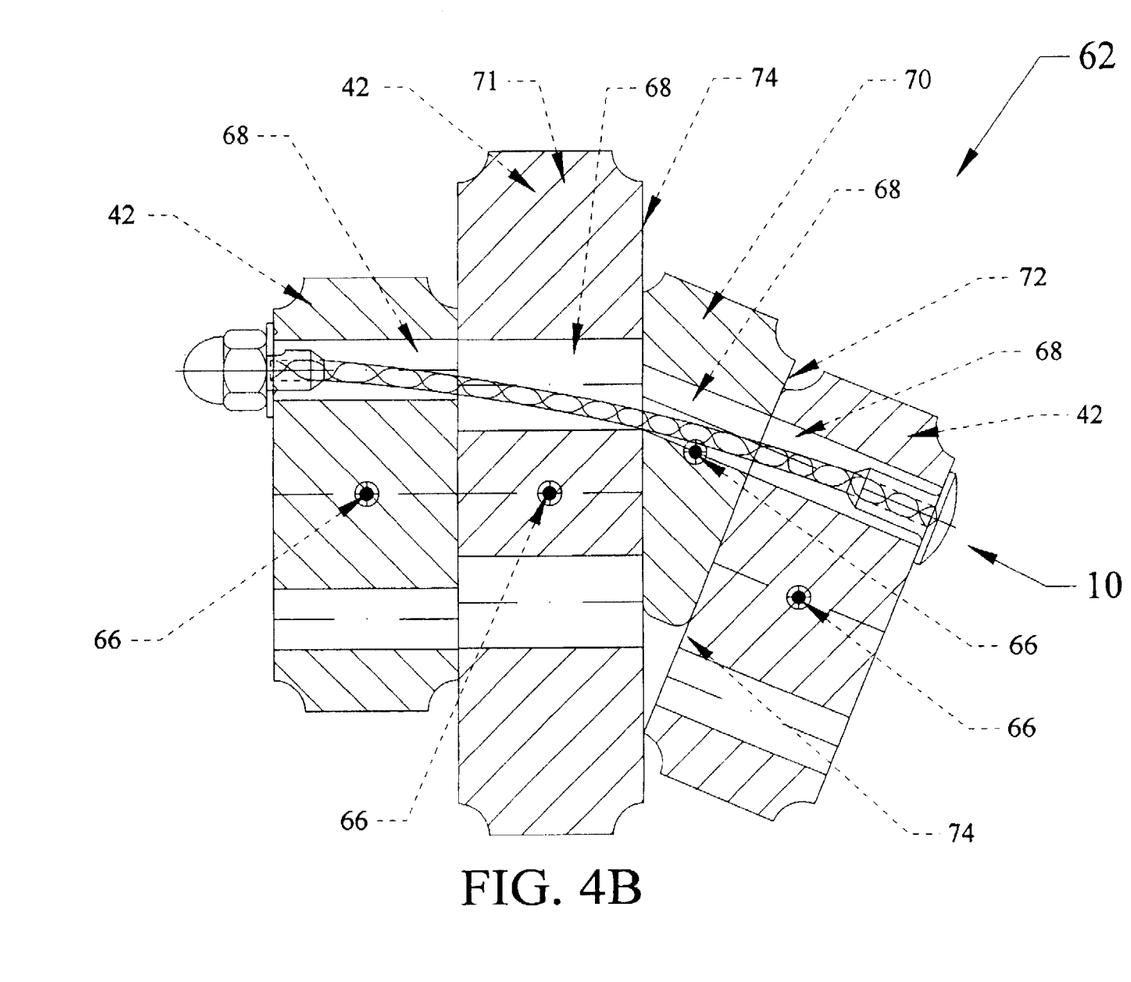
Figure 4C:
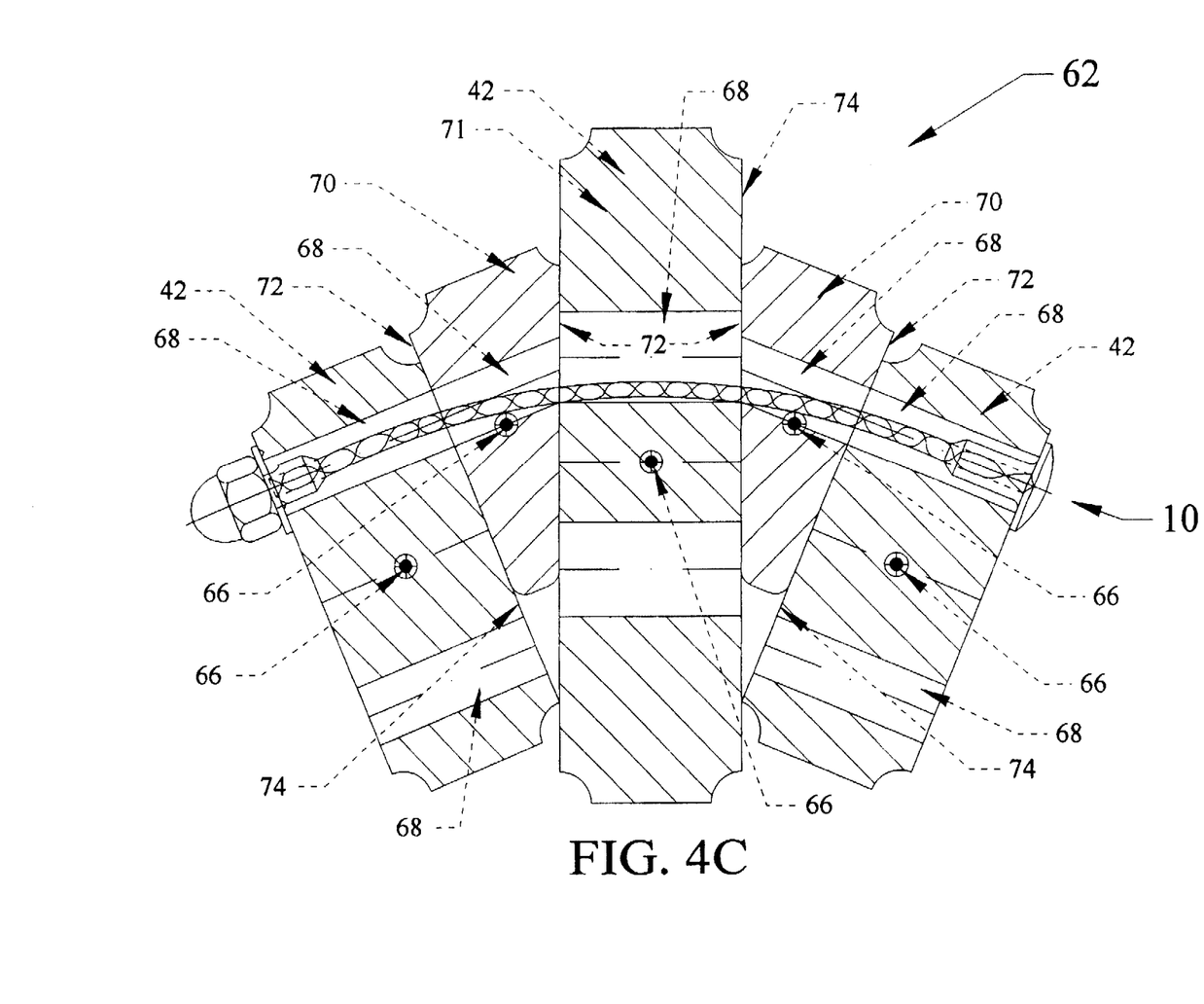
Figure 4D:
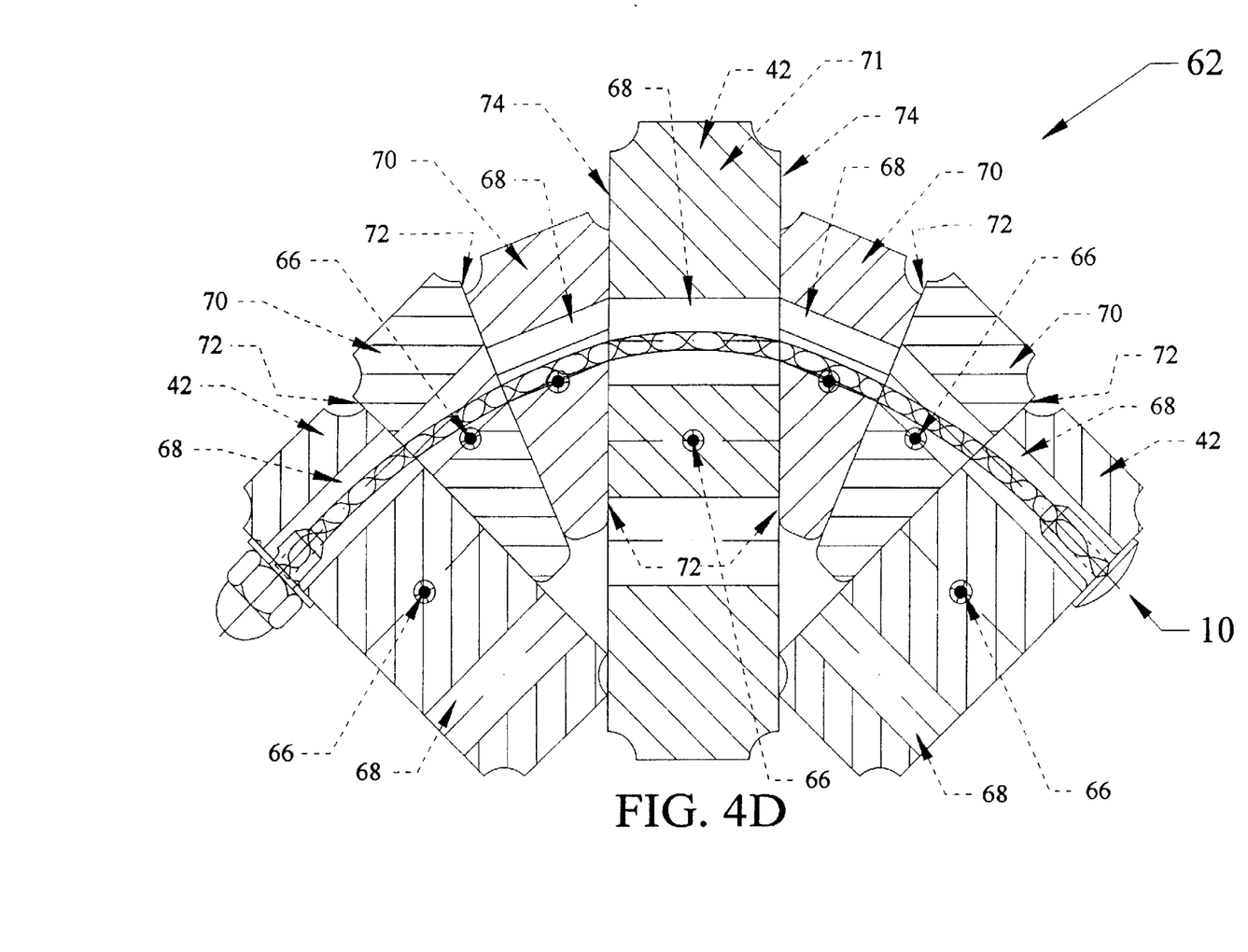
Figure 5A:
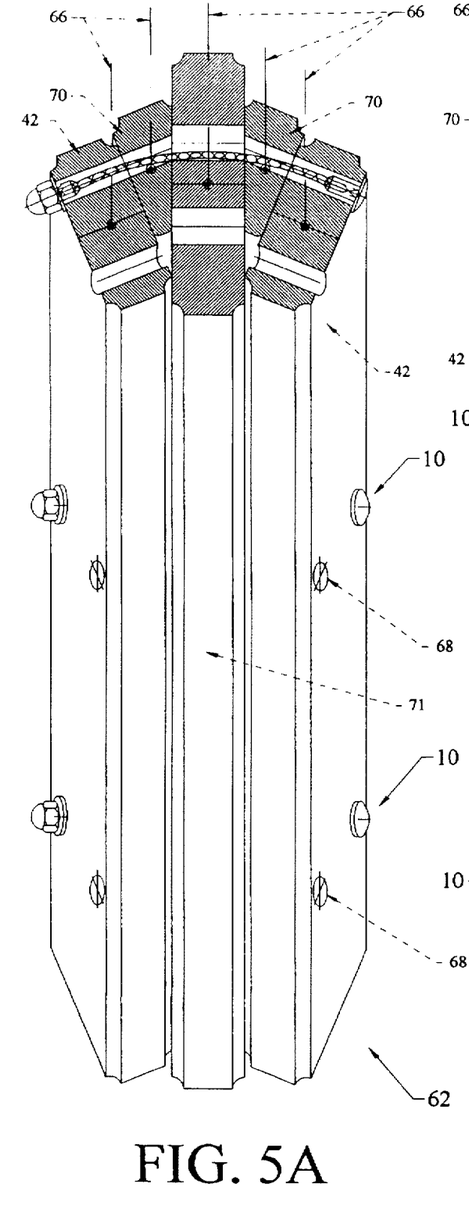
FIGS. 5A and 5B are perspective views of an upright corner assembly.
Figure 5B:
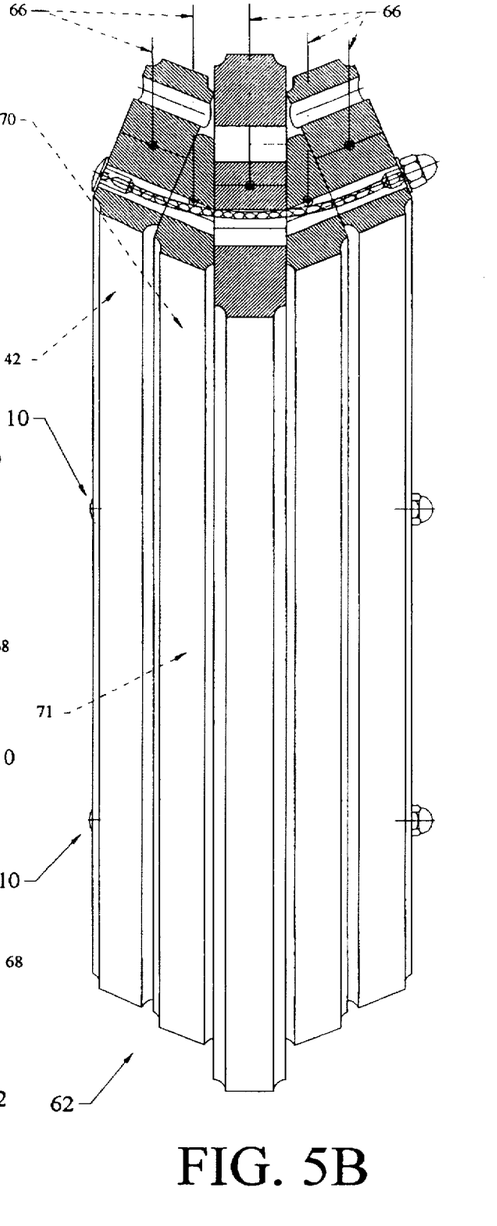

Wedge shaped frame members 70, as illustrated in FIGS. 4B–4D, are provided to produce a desired angle. The members 70 have flat opposite sides 72 in angled relation to one another for side-by-side confronting engagement with flat surfaces 74 of other frame members 42 of said plurality of frame members (FIG. 4B). Accordingly, the hole 68 of the wedge shaped frame member 70 has a longitudinal axis in axially angled relationship with a longitudinal axis of the hole 68 of an immediately adjacent frame member 42,70. As illustrated, the use of members 70 having a 22.5° angle allows for the creation of corners of various angles as shown with the holes 68 of the frame members 42,70 being generally arcuately aligned. Similarly, the use of wedged shaped members 70 having angles of varied degree, such as 30° and the like could be used. Further, the use of standardized members allows for decreased costs in producing the various frame members 42,70, especially where the frame members 42,70 are to be sold in kits with the flexible connectors 10.

In some applications, combinations of different numbers of member 70 in a single assembly allow for the creation of corners with various angular relation without changes to any of the members 42, which in some cases may be a centermost member that is providing loading bearing strength to a structure 64. This also allows for the creation of standard geometric shapes of a structure 64 (FIG. 6), such as octagons and hexagons, or alternatively other polygon shapes.

For proper alignment of the holes 68, the longitudinal axis of the hole 68 of each of the frame members 42,70 is preferably perpendicular to one of the flat opposite sides. Further, each hole 68 of frame members 42,70 is greater than a diameter of the first rigid end portion 12 so the first rigid end portion 12 is relatively movable within each hole 68 with the longitudinal axis of the first rigid end portion 12 being positionable in angled relationship with the longitudinal axis of each hole 68 as the first rigid end portion 12 is extended through each hole 68.

In FIG. 4C for example, where the first rigid end portion has a ⅛" diameter and is approximately 1.0" in length, the holes 68 of the frame members 42,70 have a diameter of ½" with a centermost frame member 42 indicated by the numeral 71 having a diameter of ¾". Typically, the centermost positioned member 71 provides support of vertical loads of the structure 64 and extends from ground level or below and up to other and secured with members 71 which are then functioning as roof rafters, as shown in FIG. 2.

It is important to note that if the holes 68 were not oversized in this fashion, the first rigid end portion 12 would not be extendible through the holes in the segmented arcuate manner as shown. Further, the oversized feature of these holes also allows for some degree of flexibility and adjustability of the structure 64, as later described.

Referring to FIG. 6, the building structure 64 is constructed with a plurality of upstanding corner connection assemblies 62 as previously described which are interconnected to one another by connecting members 75. While each of the corner connection assemblies 62 form strong corners of the structure, they at the same time allow the corner to be slightly yielding or movable in each geometric plane. In FIG. 2, it should be noted that corner assembly 77 is produced for the connection of members 42, which in this embodiment function as roof rafters to hold roof panels of the structure 64 together, as also shown in combination with the corners or assemblies 62 in the polygonal structure 64 illustrated in FIG. 6. Further, in making standard geometrically shaped structures, as illustrated in FIG. 6, using members 75 that form large rectangular sides that extend between respective members 71, it is important to accommodate variation of the length of such sides or members 75 without changing the angle of the structure. The use of the split beam corner assembly 62 provides a solution to this problem due to the flexibility of the corner 62 as previously provided, as well as the slight movability of the wedge shaped members 70.

As an additional feature of the corner connection assemblies 62 of the present invention, the various above described frame members are formed of extruded profiles made of a rigid foam or cellular PVC that can replace the use of wood. Pre-machined frame members including vertical posts, split beams, rafters, horizontal beams, vertical beams and the like commonly used in building construction can be supplied as building modules or kits that can be assembled with the flexible connector 10 for quick dismantling and re-assembly. The flexible connector 10 is provided in standardized lengths for use in such applications.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. A flexible connector for use in holding at least two frame members together, the flexible connector comprising: a first rigid end portion having threaded surfaces, the first rigid end portion adapted for receiving a threaded nut, a second rigid end portion having an enlarged head at a distal end thereof, an elongated flexible member formed of cable attached to and extending between the first and second rigid end portions, the elongated flexible member having a diameter less than respective diameters of the first and second rigid end portions so that the elongated flexible member has increased flexibility, each of the first and second rigid end portions having a sloped annular surface extending inwardly from each respective end portion towards the elongated flexible member, and a spike washer having an aperture therethrough, the spike washer being engageable on the first rigid end portion, the first rigid end portion and aperture being shaped and configured for mated engagement to prevent rotation of the first rigid end portion, the spike washer having at least two projections outwardly extending from an inner facing surface of the spike washer, whereby said flexible connector can be fished through aligned holes in said at least two frame members.

2. The flexible connector of claim 1, wherein the spike washer has at least three projections, each projection having a pointed end, the projections being annularly spaced apart from one another.

3. The flexible connector of claim 1, wherein the aperture and a nut and washer receiving portion of the first rigid end portion are generally D-shaped having a semi-circular portion and a flat portion.

4. The flexible connector of claim 3, wherein the elongated flexible member has a diameter of approximately one half the size than respective diameters of the first and second rigid end portions.

5. The flexible connector of claim 1, wherein a distal end of the first rigid end portion has a convex annular surface co-axial with a longitudinal axis of the first rigid end portion.

6. The flexible connector of claim 1, wherein the enlarged head has a flange on an inwardly facing side of the enlarged head sized for flush engagement against a frame member, the enlarged head having a convex annular outer surface on an outwardly facing side of the enlarged head co-axial with a longitudinal axis of the second rigid end portion.

7. A flexible connector for use in holding at least two frame members together, the flexible connector comprising: a first rigid end portion having threaded surfaces, the first rigid end portion adapted for receiving a threaded nut, a second rigid end portion having an enlarged head at a distal end thereof, an elongated flexible member attached to and extending between the first and second rigid end portions, and a spike washer having an aperture therethrough, the spike washer being engageable on the first rigid end portion, the first rigid end portion and aperture being shaped and configured for mated engagement to prevent rotation of the first rigid end portion, the spike washer having at least two projections outwardly extending from an inner facing surface of the spike washer, whereby said flexible connector can be fished through aligned holes in said at least two frame members.

8. The flexible connector of claim 7, wherein the elongated flexible member is formed of cable.

9. The flexible connector of claim 8, wherein the elongated flexible member has a diameter less than respective diameters of the first and second rigid end portions so that the elongated flexible member has increased flexibility.

10. The flexible connector of claim 9, wherein the elongated flexible member has a diameter of approximately one half the size than respective diameters of the first and second rigid end portions.

11. The flexible connector of claim 9, wherein each of the first and second rigid end portions have a sloped annular surface extending inwardly from each respective end portion towards the elongated flexible member.

12. The flexible connector of claim 11, wherein the spike washer has at least three projections, each projection having a pointed end, the projections being annularly spaced apart from one another.

13. The flexible connector of claim 9, wherein the aperture and a nut and washer receiving portion of the first rigid end portion are generally D-shaped having a semi-circular portion and a flat portion.

14. The flexible connector of claim 9, wherein a distal end of the first rigid end portion has a convex annular surface co-axial with a longitudinal axis of the first rigid end portion.

15. The flexible connector of claim 14, wherein the enlarged head has a flange on an inwardly facing side of the enlarged head sized for flush engagement against a frame member, the enlarged head having a convex annular outer surface on an outwardly facing side of the enlarged head co-axial with a longitudinal axis of the second rigid end portion.

16. A corner connection assembly for use in a structure, comprising: a plurality of frame members oriented in side-by-side pressing engagement with one another, a longitudinal axis of each of said plurality of frame members being parallel to one another, each of said plurality of frame members having a hole extending therethrough perpendicular to each respective longitudinal axis, each of said holes between adjacently engaging frame members being in overlapping adjacency with one another, a flexible corner connector adapted for extending through the holes of the plurality of frame members to secure the plurality of frame members in unitary assembly, the flexible corner connector including a first rigid end portion having threaded surfaces, the first rigid end portion adapted for receiving a threaded nut and projecting outwardly from the hole of one of said plurality of frame members having a surface facing outwardly from the plurality of frame members, the flexible corner connector including a second rigid end portion having an enlarged head at a distal end thereof and an elongated flexible member attached to and extending between the first and second rigid end portions, and a spike washer having an aperture therethrough, the spike washer being engageable on the first rigid end portion, the first rigid end portion and aperture being shaped and configured for mated engagement to prevent rotation of the first rigid end portion, the spike washer having at least two projections outwardly extending from an inner facing surface of the spike washer for biting engagement into the surface of the one of said plurality of frame members, whereby said flexible corner connector can be fished through said holes in each of said plurality of frame members.

17. The corner connection assembly of claim 16, wherein at least one of said plurality of frame members is wedge shaped and has flat opposite sides in angled relation to one another for side-by-side confronting engagement with flat surfaces of other frame members of said plurality of frame members, the hole of the at least one of said plurality of frame members having a longitudinal axis in axially angled relationship with a longitudinal axis of the hole of an immediately adjacent frame member of said plurality of frame members.

18. The corner connection assembly of claim 17, wherein the longitudinal axis of the hole of the at least one of said plurality of frame members is perpendicular to one of said flat opposite sides.

19. The corner connection assembly of claim 17, wherein each hole of said plurality of frame members is greater than a diameter of the first rigid end portion so the first rigid end portion is relatively movable within each hole with a longitudinal axis of the first rigid end portion being positionable in angled relationship with a longitudinal axis of each hole as the first rigid end portion is extended through each hole.

20. The corner connection assembly of claim 16, wherein the elongated flexible member is formed of cable.

21. The corner connection assembly of claim 19, wherein the elongated flexible member has a diameter less than respective diameters of the first and second rigid end portions so that the elongated flexible member has increased flexibility.

22. The corner connection assembly of claim 21, wherein the elongated flexible member has a diameter of approximately one half the size than respective diameters of the first and second rigid end portions.

23. The corner connection assembly of claim 16, wherein each of the first and second rigid end portions have a sloped annular surface extending inwardly from each respective end portion towards the elongated flexible member.

24. The corner connection assembly of claim 16, wherein the spike washer has at least three projections, each projection having a pointed end, the projections being annularly spaced apart from one another.

25. The corner connection assembly of claim 24, wherein the aperture of the spike washer and a nut and washer receiving portion of the first rigid end portion are generally D-shaped having a semi-circular portion and a flat portion.

26. The corner connection assembly of claim 16, wherein a distal end of the first rigid end portion has a convex annular surface co-axial with a longitudinal axis of the first rigid end portion.

27. The corner connection assembly of claim 25, wherein the enlarged head has a flange on an inwardly facing side of the enlarged head sized for flush engagement against one of said plurality of frame members, the enlarged head having a convex annular outer surface on an outwardly facing side of the enlarged head co-axial with a longitudinal axis of the second rigid end portion.

28. A building structure comprising: a plurality of upstanding corner connection assemblies interconnected to one another by connecting members, each of said upstanding corner connection assemblies including: a plurality of frame members oriented in side-by-side engagement with one another, a longitudinal axis of each of said plurality of frame members being parallel to one another, each of said plurality of frame members having a hole extending therethrough perpendicular to each respective longitudinal axis, each of said holes between adjacently engaging frame members being in overlapping adjacency with one another, a flexible corner connector adapted for extending through the holes of the plurality of frame members to secure the plurality of frame members in unitary assembly, the flexible corner connector including a first rigid end portion having threaded surfaces, the first rigid end portion adapted for receiving a threaded nut and projecting outwardly from the hole of one of said plurality of frame members having a surface facing outwardly from the plurality of frame members, the flexible corner connector including a second rigid end portion having an enlarged head at a distal end thereof and an elongated flexible member attached to and extending between the first and second rigid end portions, each hole of said plurality of frame members being greater than a diameter of the first rigid end portion so the first rigid end portion is relatively movable within each hole with a longitudinal axis of the first rigid end portion being positionable in angled relationship with a longitudinal axis of each hole as the first rigid end portion is extended through each hole, and a spike washer having an aperture therethrough, the spike washer being engageable on the first rigid end portion, the first rigid end portion and aperture being shaped and configured for mated engagement to prevent rotation of the first rigid end portion, the spike washer having at least two projections outwardly extending from an inner facing surface of the spike washer for biting engagement into the surface of the one of said plurality of frame members, whereby said flexible corner connector can be fished through said holes in each of said plurality of frame members.

29. The building structure of claim 28, wherein the elongated flexible member is formed of cable and has a diameter less than respective diameters of the first and second rigid end portions so that the elongated flexible member has increased flexibility.

30. The building structure of claim 28, wherein each of the first and second rigid end portions have a sloped annular surface extending inwardly from each respective end portion towards the elongated flexible member.

31. The building structure of claim 29, wherein the spike washer has at least three projections, each projection having a pointed end, the projections being annularly spaced apart from one another.

32. The building structure of claim 31, wherein the aperture of the spike washer and a nut and washer receiving portion of the first rigid end portion are generally D-shaped having a semi-circular portion and a flat portion.

33. The building structure of claim 29, wherein a distal end of the first rigid end portion has a convex annular surface co-axial with a longitudinal axis of the first rigid end portion.

34. The building structure of claim 28, wherein at least one of said plurality of frame members is wedge shaped, and the holes of each of said plurality of frame members are approximately arcuately aligned.

\* \* \* \* \*